(12) United States Patent
Harding

(10) Patent No.: US 8,713,908 B2
(45) Date of Patent: May 6, 2014

(54) FUEL INJECTOR ARRANGEMENT HAVING AN IGNITER

(75) Inventor: Stephen C. Harding, Bristol (GB)

(73) Assignee: Rolls-Royce PLC, London (GB)

( * ) Notice: Subject to any disclaimer, the term of this patent is extended or adjusted under 35 U.S.C. 154(b) by 65 days.

(21) Appl. No.: 13/427,424

(22) Filed: Mar. 22, 2012

(65) Prior Publication Data

US 2012/0260664 A1    Oct. 18, 2012

(30) Foreign Application Priority Data

Apr. 13, 2011    (GB) .................................. 1106233.8

(51) Int. Cl.
*F02C 7/264*    (2006.01)
*F02G 1/055*    (2006.01)
*F02G 3/00*    (2006.01)

(52) U.S. Cl.
USPC .............. 60/39.821; 60/737; 60/740; 60/742; 60/39.827; 60/776

(58) Field of Classification Search
USPC ............ 60/737–748, 39.821, 39.827, 39.828, 60/39.37, 776, 804, 772
See application file for complete search history.

(56) References Cited

U.S. PATENT DOCUMENTS

| | | | | |
|---|---|---|---|---|
| 5,170,727 A * | 12/1992 | Nielsen | .......................... | 110/346 |
| 5,628,180 A * | 5/1997 | DeFreitas | ........................ | 60/776 |
| 6,691,515 B2 * | 2/2004 | Verdouw et al. | ................ | 60/737 |
| 7,862,901 B2 * | 1/2011 | Darolia et al. | ................ | 428/632 |
| 8,490,405 B2 * | 7/2013 | Scarinci | .......................... | 60/778 |
| 2002/0092302 A1 | 7/2002 | Johnson et al. | | |
| 2005/0188702 A1 * | 9/2005 | Bachovchin et al. | ........... | 60/776 |
| 2007/0137207 A1 * | 6/2007 | Mancini et al. | ................. | 60/737 |
| 2010/0186368 A1 * | 7/2010 | Ikeda | .......................... | 60/39.821 |
| 2011/0120077 A1 * | 5/2011 | Bottcher et al. | ........... | 60/39.827 |
| 2012/0117976 A1 * | 5/2012 | Krull et al. | ....................... | 60/776 |

OTHER PUBLICATIONS

Aug. 9, 2011 British Search Report issued in Patent Application No. 1106233.8.

* cited by examiner

*Primary Examiner* — Craig Kim
(74) *Attorney, Agent, or Firm* — Oliff PLC

(57) ABSTRACT

An arrangement for a combustion chamber the arrangement comprising a combustion chamber, an injector for injecting fuel into the combustion chamber and an igniter for supplying a spark for igniting fuel so injected, wherein the injector has a passage through which air is supplied to the combustion chamber in use, the igniter being positioned upstream of the combustion chamber such that a spark generated by the igniter is conveyed along the passage by the injector air.

15 Claims, 3 Drawing Sheets

FUEL INJECTOR ARRANGEMENT HAVING AN IGNITER

BACKGROUND

The present invention relates to fuel injectors and particularly injectors for injecting fuel into the combustor of a gas turbine engine. The invention also relates to igniters which provide energy to ignite fuel and an arrangement of an igniter and an injector particularly in a gas turbine engine.

SUMMARY

With reference to FIG. 1, a ducted fan gas turbine engine generally indicated at 10 comprises, in axial flow series, an air intake 1, a propulsive fan 2, an intermediate pressure compressor 3, a high pressure compressor 4, combustion equipment 5, a high pressure turbine 6, an intermediate pressure turbine 7, a low pressure turbine 8 and an exhaust nozzle 9.

Air entering the air intake 1 is accelerated by the fan 2 to produce two air flows, a first air flow into the intermediate pressure compressor 3 and a second air flow that passes over the outer surface of the engine casing 12 and which provides propulsive thrust. The intermediate pressure compressor 3 compresses the air flow directed into it before delivering the air to the high pressure compressor 4 where further compression takes place.

Compressed air exhausted from the high pressure compressor 4 is directed into the combustion equipment 5, where it is mixed with fuel that is injected from a fuel injector 14 and the mixture combusted. The resultant hot combustion products expand through and thereby drive the high 6, intermediate 7 and low pressure 8 turbines before being exhausted through the nozzle 9 to provide additional propulsive thrust. The high, intermediate and low pressure turbines respectively drive the high and intermediate pressure compressors and the fan by suitable interconnecting shafts.

Traditionally the fuel and air mixture in the combustion volume is ignited by an igniter that protrudes directly into the combustion volume and generates a spark within the volume of sufficient energy to ignite the mixture.

It is an object of the present invention to seek to provide an improved arrangement for combustion.

According to a first aspect of the invention there is provided an arrangement for a combustion chamber the arrangement comprising a combustion chamber, an injector for injecting fuel into the combustion chamber and an igniter for supplying a spark for igniting fuel so injected, wherein the injector has a passage through which air is supplied to the combustion chamber in use, the igniter being positioned upstream of the combustion chamber such that a spark generated by the igniter is conveyed along the passage by the air.

The combustion chamber may be an annular in that it is bounded by a radially inner circumferential wall extending about the axis X-X of the gas turbine and a coaxial radially outer circumferential wall. Alternatively the combustion chamber may be can-annular.

Upstream and downstream are defined relative to the intended or actual flow of air through the engine.

Preferably the igniter has a tip for generating the spark, the tip terminating within the injector. In an alternative arrangement the igniter may have a tip generating the spark, the tip terminating upstream of the injector.

The passage may have a length between 5 mm and 100 mm but typically between 5 mm and 40 mm The injector may be a concentric injector having an axial pilot injector and a coaxially located mains injector positioned radially outside the pilot injector. The passage may provide part of the pilot injector.

Preferably the injector has an upstream edge past which air flows in use to enter the injector and a downstream edge facing the combustor and the passage extends axially from the upstream edge to the downstream edge. In an alternative arrangement the injector may have an outer circumference and a downstream edge facing the combustor, wherein the passage extends first radially and then axially from the outer circumference to the downstream edge.

According to a second aspect of the invention there is provided a gas turbine having an arrangement according to any of the preceding claims.

According to a third aspect of the invention there is provided a method of supplying a spark to ignite a fuel, the method comprising the steps of providing a combustor, an injector, and an igniter and supplying fuel from the injector into the combustor, supplying air to the combustor through a passage in the injector the air mixing with the fuel to provide a combustible mixture and conveying with the air supplied through the passage a spark generated by the igniter.

The igniter may have a tip generating the spark wherein the tip is located within the passage. The tip may be located upstream of the passage.

Preferably the spark exists for at least 2 ms. Preferably the time taken for the spark to travel from the igniter to the combustor through the passage is less than 2 ms.

The fuel may be supplied by the injector to the combustor as atomised droplets.

BRIEF DESCRIPTION OF THE DRAWINGS

The invention will now be described by way of example only in which.

DETAILED DESCRIPTION OF EMBODIMENTS

Figure 1:
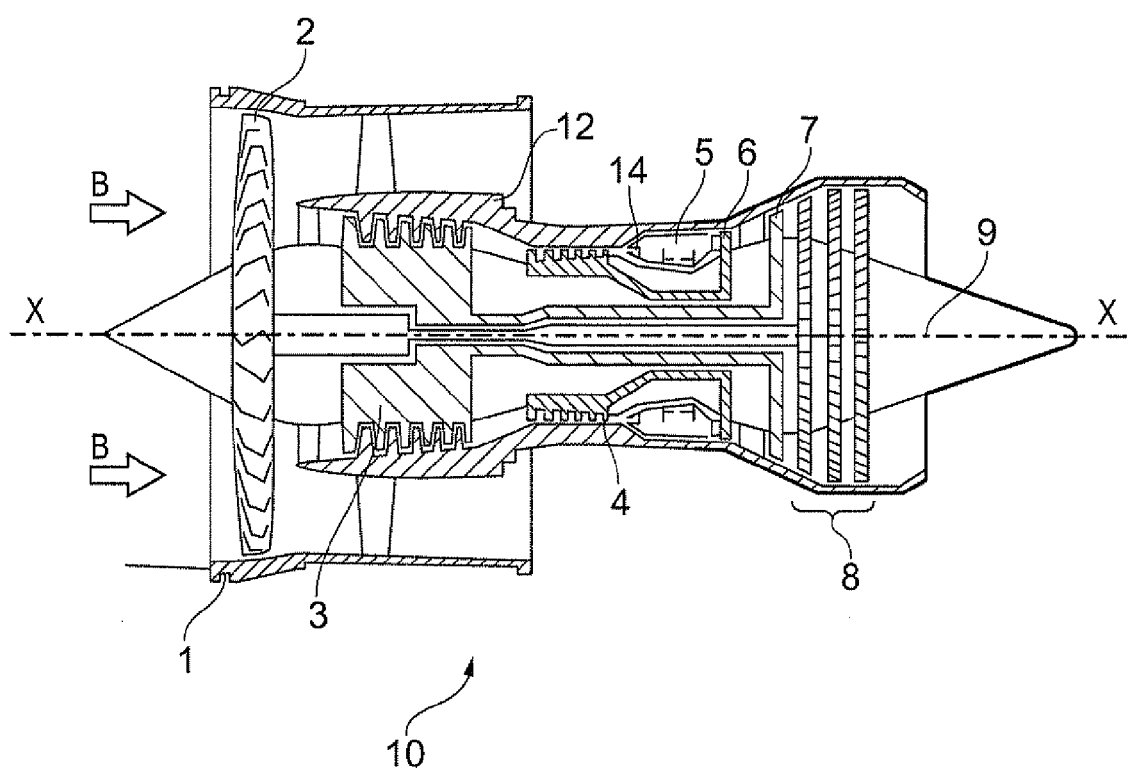
FIG. 1 depicts a ducted fan gas turbine engine.
Figure 2:
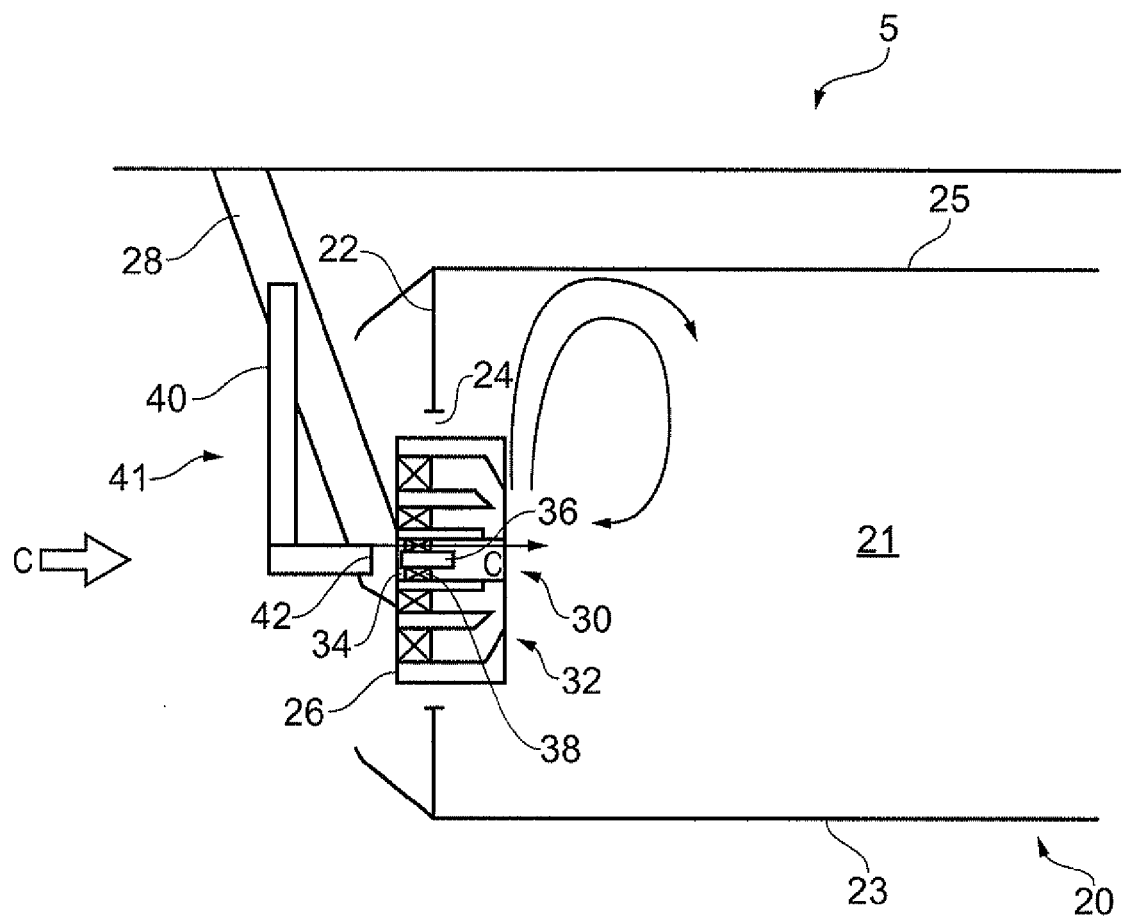
FIG. 2 depicts a combustion arrangement in accordance with the invention.

FIG. 2 depicts a schematic combustion arrangement 5 in accordance with the invention. The arrangement has an annular combustion chamber 20 which extends about the axis X-X (FIG. 1) of the turbine engine and has a radially inner wall 23 and radially outer wall 25. At the upstream end of the combustion chamber is a radially extending wall 22 having a plurality of circumferentially spaced apertures 24 (one is shown) containing an injector head 26. The injector head supplies fuel to the combustion volume 21 via a plurality of nozzles or via a slot or plurality of slots which supply fuel to a prefilmer surface over which air flows and then entrains the fuel at a tip of the prefilmer.

The head is supported by a stalk 28 which has a passageway to supply fuel to the injector nozzles.

Air is supplied to the combustion volume through the injector head. In a combustion arrangement known as lean burn a significant volume, up to 70%, of the combustion air is supplied through the injector. In alternative arrangements known as rich burn less of the combustion air, typically less than 30%, is supplied through the injectors with the majority of the air being supplied through apertures in one or more of the radially inner or radially outer walls.

The injector head 26 shown is a radially staged lean burn injector but the invention is equally applicable to rich burn injectors.

Radially staged lean burn injectors are known in the art and have a central pilot 30 which continuously supplies fuel to the combustion volume during operation and an outer mains 32 having a separate supply of fuel and which is used at higher power requirements.

The injector is provided with a passage 34 through which air C is supplied to the combustion volume. The air entrains fuel ejected through a nozzle 36 and carries it to the combustion volume where it is burnt. An array of swirlers impart a tangential moment to the air as it passes through the passage.

An igniter 41 having an igniter tip 42 is mounted upstream of both the combustion volume and the injector and generates a spark at the tip when an appropriate voltage is supplied. Typically the ignitors used require a power supply of 2 kV with a 12J oscillatory charge or 3 kV with a 6J unidirectional charge. Other power supplies may also be appropriate. The igniter tip is around 12 mm in diameter.

The spark generated by the igniter has a finite energetic lifetime determined by the heat losses and convection/diffusion of the plasma. This finite time, during normal use, is at least 2 ms. By locating the igniter tip upstream of the injector a spark created by the igniter has a lifetime that is longer than the time it takes for an air flow to pass through the injector and into the combustion volume. In this way a spark can be generated which is conveyed by the air flow through a passage in the injector into the combustion volume where it can ignite the combustible mixture of atomised fuel and air.

Figure 3:
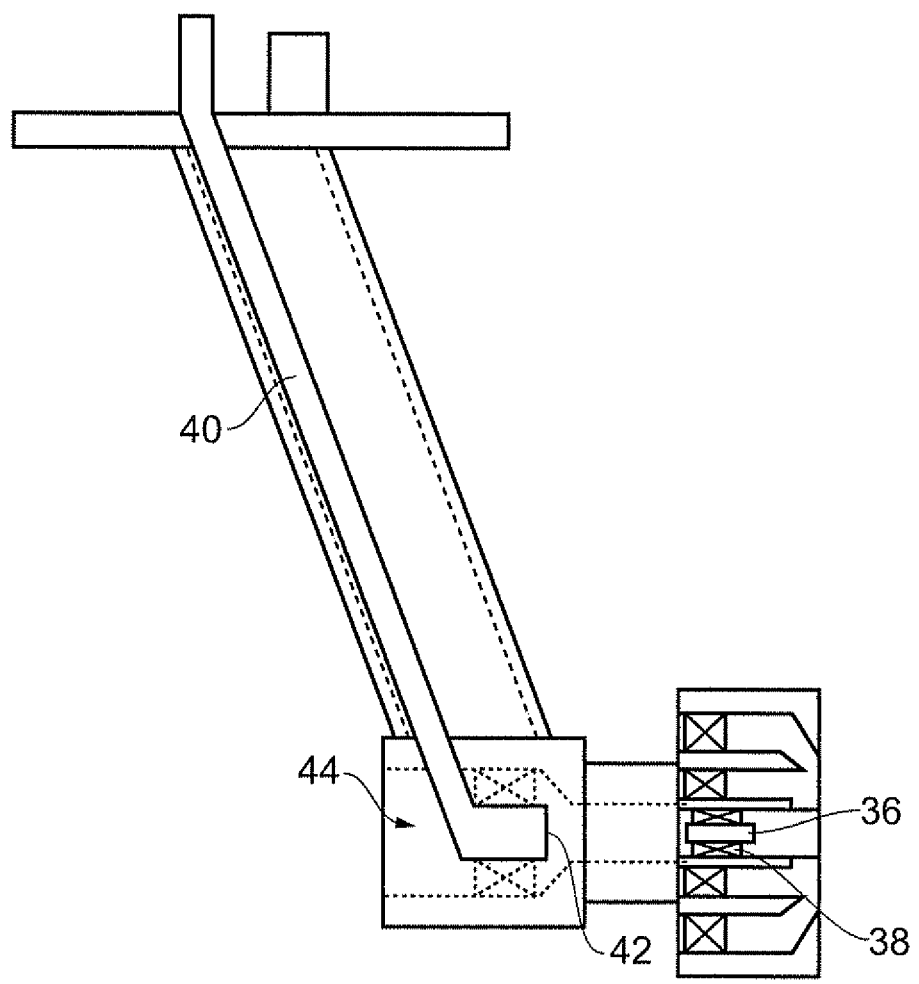
FIG. 3 depicts an alternative combustion arrangement in accordance with the invention.

In an alternative arrangement shown in FIG. 3 the igniter tip is within the injector, The electrical connection lead 40 is conveyed through a passage within the stalk 28 of the injector. Although the lead is depicted as being conveyed through the injector stalk this is, of course, optional as the lead 40 may be within the air flow as shown in FIG. 2.

A modification to the injector head may be required for this embodiment to enlarge the airflow passage 44 around the igniter tip to ensure adequate flow of air into the combustion volume. Swirlers and a passage contraction downstream of the tip may be required to allow the fuel and air exits from the head and which are presented to the combustor to remain unchanged.

It will be apparent that this arrangement offers a number of significant advantages. Firstly the air flow over the igniter tip is relatively constant meaning that it is easier to control the movement of the generated spark. In direct contrast the flow fields within the combustion chamber are highly complex and turbulent. Secondly, the spark is directed into the combustible mixture at the exit of the injector and directly into the pilot zone where the injector is staged. In contrast a spark applied from an igniter within the combustor and within the complex flow field is remote from the fuel supply and may not be conveyed into a region with an appropriate stoichiometric quantity of fuel. Accordingly, greater control and reliability of the ignition process is afforded. Thirdly, the igniter is located in a region of relatively benign conditions when compared with the conditions within the combustion volume. This allows use of a material that has a less stringent temperature capability than used for igniters within the combustion chamber. Forthly, igniters generate the spark with momentum and the location upstream of the injector allows the momentum to be towards the combustion volume which reduces the residence time of the spark within the passage. The improved ignition reliability afforded by the combustion arrangement may permit the injector to be modified to change the level of mixing which improves other factors such as smoke and NOx. Such a modification may not be possible if ignition is difficult as may be the case in current arrangements.

The fuel injector may be designed with dielectric materials close to the tip of the igniter in order to prevent the sprak earthing against the injector. A ceramic based Thermal barrier coating (typically yttria stabilised zirconia) may assist in prevent such earthing.

The invention claimed is:

1. An arrangement for a gas turbine engine, the arrangement comprising:
    a combustion chamber.,
    an injector for injecting fuel into the combustion chamber, and
    an igniter for supplying a spark for igniting fuel so injected, wherein
    the injector has a passage through which air is supplied to the combustion chamber in use, the igniter being positioned upstream of the combustion chamber such that a spark generated by the igniter is conveyed along the passage by the air, and
    the igniter has a tip for generating the spark, the tip terminating upstream of the injector.

2. An arrangement according to claim 1, wherein the passage has a length between 5 mm and 40 mm.

3. An arrangement according to claim 1, wherein the injector is a concentric injector having an axial pilot injector and a coaxially located mains injector positioned radially outside the pilot injector.

4. An arrangement according to claim 3, wherein the passage conveys air to the pilot injector.

5. An arrangement according to claim 1, wherein the injector has an upstream edge past which air flows in use to enter the injector and a downstream edge facing the combustor and the passage extends axially from the upstream edge to the downstream edge.

6. An arrangement according to claim 1, wherein the injector has an outer circumference and a downstream edge facing the combustor, wherein the passage extends first radially and then axially from the outer circumference to the downstream edge.

7. An arrangement according to claim 3, wherein the injector has a coating of a dielectric material downstream of the igniter tip to prevent the spark earthing to the injector.

8. An arrangement according to claim 7, wherein the dielectric material is a thermal barrier coating of yttria stabilised zirconia.

9. A gas turbine having an arrangement according to claim 3.

10. A method of supplying a spark to ignite a fuel, the method comprising the steps of:
    providing a combustor, an injector, and an igniter;
    supplying fuel from the injector into the combustor; and
    supplying air to the combustor through a passage in the injector,
    the air mixing with the fuel to provide a combustible mixture and conveying with the air supplied through the passage a spark generated by the igniter,
    the igniter being disposed upstream of an injector fuel supply opening, and
    the igniter has a tip for generating the spark, the tip terminating upstream of the injector.

11. A method according to claim 10, wherein the igniter has a tip generating the spark and the tip is located within the passage.

12. A method of supplying a spark to ignite a fuel, the method comprising the steps of:
    providing a combustor, an injector, and an igniter;
    supplying fuel from the injector into the combustor; and supplying air to the combustor through a passage in the injector, the air mixing with the fuel to provide a combustible mixture and conveying with the air supplied through the passage a spark generated by the igniter, wherein the igniter has a tip generating the spark and the tip is located upstream of the passage.

13. A method according to claim 10, wherein the spark exists for at least 2 ms.

14. A method according to claim 13, wherein the time taken for the spark to travel from the igniter to the combustor through the passage is less than 2 ms.

15. A method according to claim 10, wherein the fuel is supplied by the injector to the combustor as atomised droplets.

* * * * *